May 5, 1925.
A. B. TAPPEN ET AL
1,536,636
STAIR TREAD
Filed Sept. 26, 1923
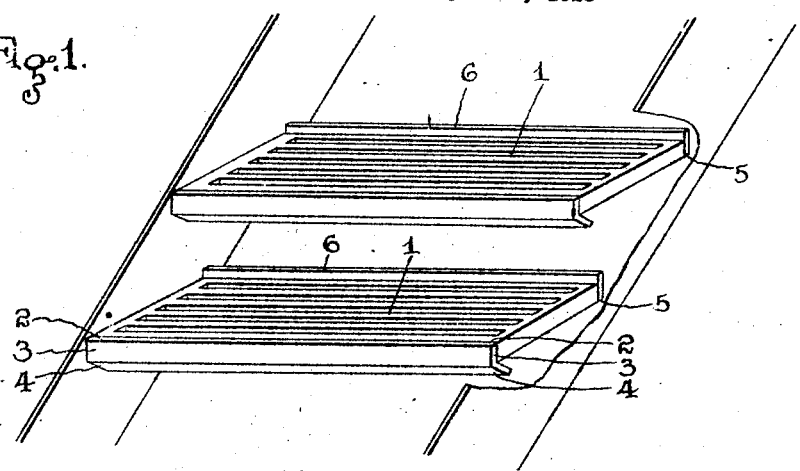
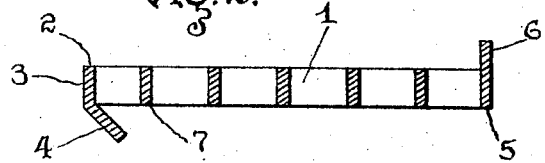
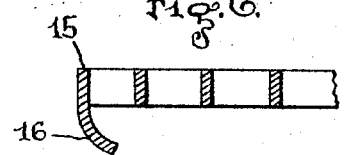
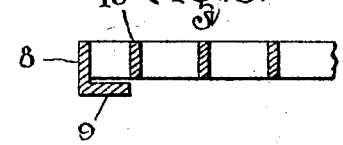
INVENTORS
Alexander Bonnell Tappen
William Hinckley Mitchell
BY
ATTORNEY Patented May 5, 1925.

1,536,636

UNITED STATES PATENT OFFICE.

ALEXANDER BONNELL TAPPEN, OF BRIARCLIFF MANOR, NEW YORK, AND WILLIAM HINCKLEY MITCHELL, OF NUTLEY, NEW JERSEY, ASSIGNORS TO HENDRICK MANUFACTURING COMPANY, OF CARBONDALE, PENNSYLVANIA, A CORPORATION OF PENNSYLVANIA.

STAIR TREAD.

Application filed September 26, 1923. Serial No. 664,865.

*To all whom it may concern:*

Be it known that we, ALEXANDER BONNELL TAPPEN, a citizen of the United States, residing at Briarcliff Manor, county of Westchester, State of New York, and WILLIAM HINCKLEY MITCHELL, a citizen of the United States, residing at Nutley, in the county of Essex and State of New Jersey, have invented certain new and useful Improvements in Stair Treads, of which the following is a specification.

This invention relates to improvements in stair treads and an object of the invention is to provide a safe, convenient and strong tread for stairs and steps.

Our improved device is particularly adapted for use in stairs and steps of the grating type. In this type of tread, as at present in use, the edge of the tread is not readily discernible when there is poor or insufficient light or where the source of light is at the foot of the stairway, the sharp edge of the tread is objectionable and a source of danger and, as risers are not ordinarily employed, the foot may slip between the risers.

A further object of the invention is to overcome these defects and also to strengthen the tread.

We accomplish these objects by the device illustrated in the accompanying drawings, in which:

Figure 1 is a perspective view of a portion of a stairway showing the use of our improved device.

Figure 2 is a cross section of our improved tread.

Figures 3, 4, 5 and 6 are cross sections of optional forms of our improved tread.

Similar characters of reference refer to similar parts throughout the several views.

Referring to the preferred form of the device shown in Figures 1 and 2, we provide on the front edge of a stair tread 1, a fascia plate 2 which comprises a vertical section 3 and an inwardly inclined skirt section 4. On the rear of the tread 1, we also preferably provide a vertical plate 5, having a section 6 which rises above the plane of the tread 1.

The fascia plate 2 serves to mark or distinguish the front edge of the step. A person descending a stairway equipped with this device will observe that the light through the treads is obstructed by the inclined skirt 4 at the edge of the tread and this skirt section 4 will also serve as a guard for the sharp edge of the tread so that danger of injury resulting from striking against the sharp edge of the tread is reduced to a minimum. The elevated guard plate 6, at the rear of the tread 1, serves to prevent the foot from slipping through between the treads and also gives greater rigidity and strength to the tread.

We prefer to position the skirt 4 of the fascia plate 2 at an angle of approximately 45° and to space the same from the adjacent grating bar 7 of the tread as this prevents the collection of dirt, water and other matter on the plate. If desired, however, the plate may be bent over at right angles, as illustrated in Figure 3. In this optional form of the device shown in Figure 3, we have shown a vertical fascia plate 8 with a section 9 positioned at right angles thereto and preferably spaced from the adjacent bar 10 of the tread grating. If desired, the skirt plate may be inverted, as illustrated in Figure 4 or Figure 5. In Figure 4 we have shown the skirt plate, which in this form becomes a part of the tread surface, so arranged that it lies flat upon the tread. In this form of the device, illustrated in Figure 4, we employ an angle iron having a vertical section 11 and a horizontal section 12, the vertical section 11 forms the fascia plate of the tread and the horizontal section 12 serves to mark the front edge of the tread.

A further optional form of the device is illustrated in Figure 5. In this form of the device we also employ an angle iron having a vertical section 13 forming the fascia plate of the tread and a horizontal section 14, which is sunk into the tread.

A further optional form of the device is illustrated in Figure 6. In this form of the device, a curved or rounded fascia plate 15 is employed, having a curved skirt section 16 depending therefrom.

Having thus described our invention, what we claim is:

1. In a device of the character described, an open stair tread and means upon the front edge thereof to distinguish the front edge from the body of the tread.

2. In a device of the character described, a stair tread, a fascia plate thereon and means on the fascia plate to obstruct the passage of light through the tread.

3. A stair tread of the grating type having means on its outer marginal edge to obstruct the passage of light through the tread.

4. A stair tread of the grating type provided with a fascia plate, a skirt section thereon inclined toward the rear of the tread and spaced from the grating bars of the tread.

5. A stair tread of the grating type, a fascia plate at the front edge thereof, a section of the fascia plate being positioned vertically thereto and a section positioned at an angle to the vertical section.

6. In a stair tread the combination of a fascia plate and a rearwardly positioned off-set plate adapted to obstruct the passage of light through the tread.

7. In a stair tread of the grating type, a fascia plate, a section off-set therefrom to obstruct the passage of light through the tread and a plate at the rear of the tread elevated above the plane of the tread.

In testimony whereof we have affixed our signatures.

ALEXANDER BONNELL TAPPEN.
WILLIAM HINCKLEY MITCHELL.